No. 703,942. Patented July 1, 1902.
H. S. MILLER & G. C. MARX.
ELECTRIC MOTOR POWER TRANSMITTING DEVICE.
(Application filed Nov. 30, 1901.)
(No Model.) 3 Sheets—Sheet 1.
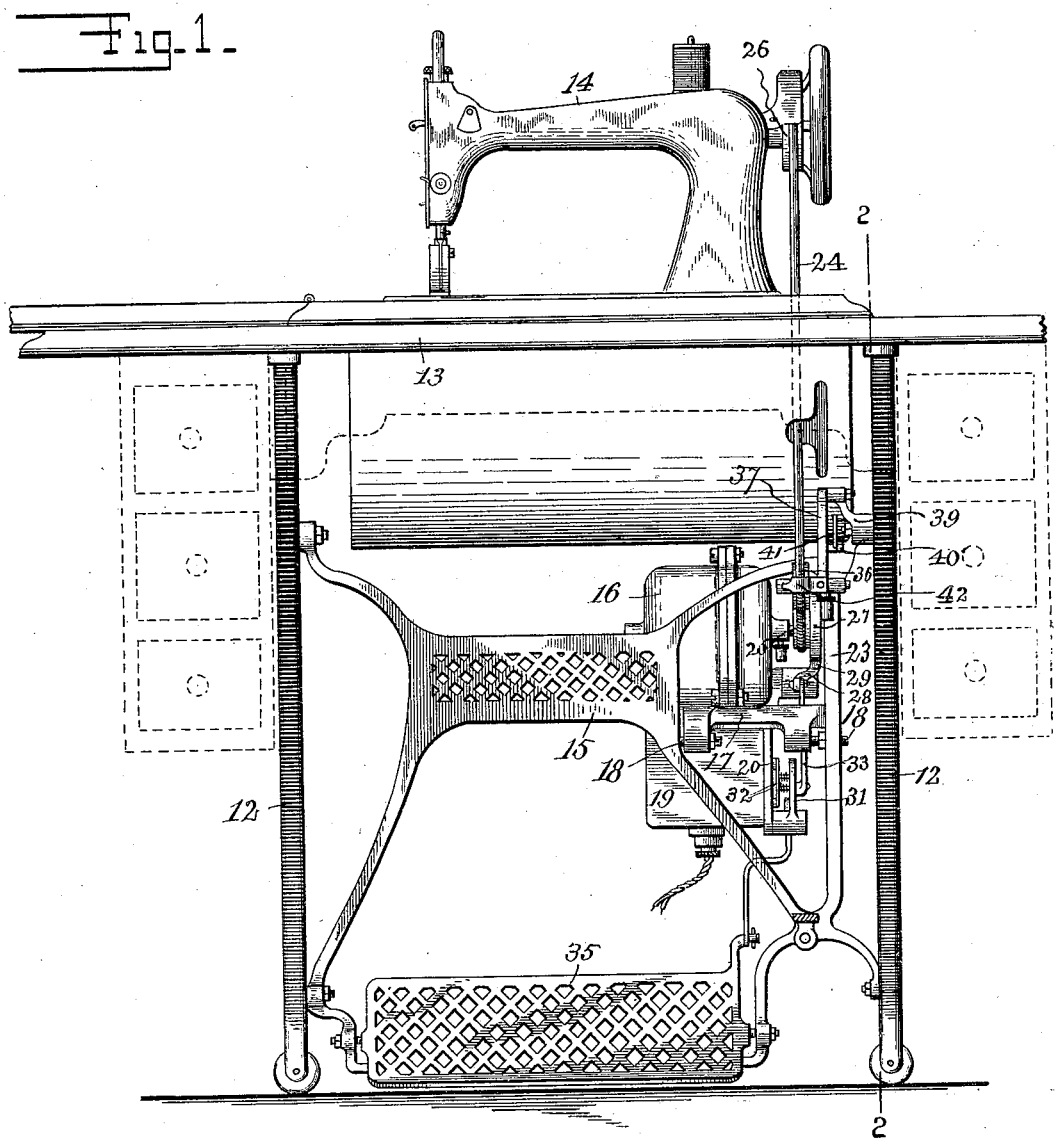

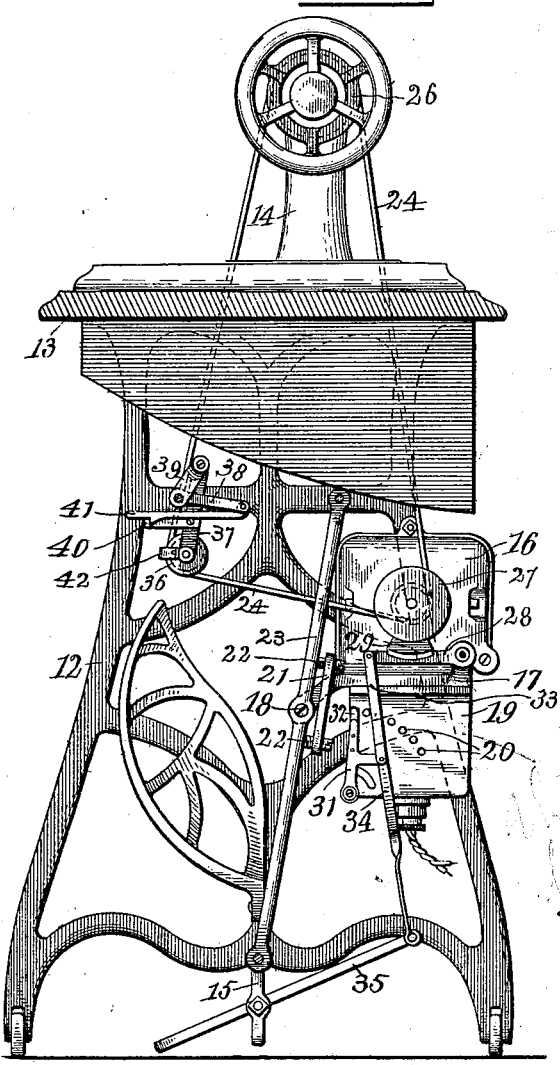

No. 703,942. Patented July 1, 1902.
H. S. MILLER & G. C. MARX.
ELECTRIC MOTOR POWER TRANSMITTING DEVICE.
(Application filed Nov. 30, 1901.)
(No Model.) 3 Sheets—Sheet 3.
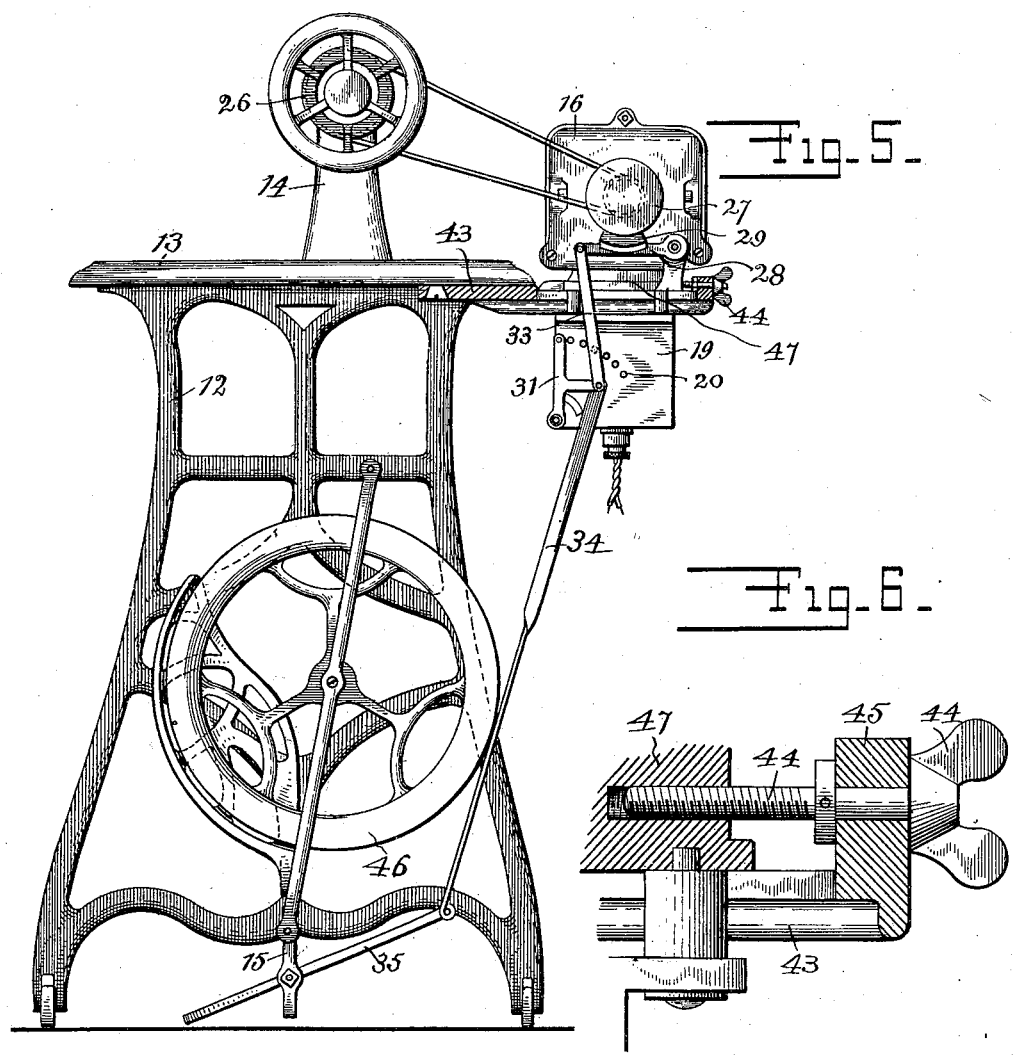
Witnesses:
Inventors:

UNITED STATES PATENT OFFICE.

HERBERT S. MILLER AND GUSTAVE C. MARX, OF ELIZABETH, NEW JERSEY, ASSIGNORS TO DIEHL MANUFACTURING COMPANY, A CORPORATION OF NEW JERSEY.

ELECTRIC-MOTOR POWER-TRANSMITTING DEVICE.

SPECIFICATION forming part of Letters Patent No. 703,942, dated July 1, 1902.

Application filed November 30, 1901. Serial No. 84,258. (No model.)

*To all whom it may concern:*

Be it known that we, HERBERT S. MILLER and GUSTAVE C. MARX, citizens of the United States, residing at Elizabeth, in the county of Union and State of New Jersey, have invented certain new and useful Improvements in Electric-Motor Power-Transmitting Devices, of which the following is a specification, reference being had therein to the accompanying drawings.

This invention has for its object to provide a simple and efficient electric-motor power-transmitting device more especially intended to be applied to sewing-machine stands or tables for the purpose of driving the sewing-machines mounted thereon and constructed for ready application to sewing-machine stands or tables now in use in substitution of or interchangeable with the treadle-operated driving-wheels with which said stands or tables are provided. The invention is, however, suitable for use in connection with other machines than sewing-machines.

The improvement comprises an electric motor the rotating shaft of which is provided with a pulley and a brake-wheel, against which latter when the motor and driven machine are at rest or are to be stopped a movable brake device mounted on the motor-frame is forced by a suitable spring, and preferably connected with said brake device, so as to be movable therewith, is a contact arm or device, through which and one of the contacts of a rheostat, over which said contact arm or device moves, the current passes to the motor when the latter is to run, but which contact arm or device is moved into such position as to break the circuit when the brake is applied to the brake-wheel of the motor and when the said motor and the machine driven thereby are to be stopped or are to be at rest. The rheostat is preferably rigidly connected with or mounted on the frame or support of the motor, and the said frame or support is preferably hinged to or pivotally mounted on the sewing-machine stand, so that by adjusting said frame on its hinged or pivotal connection with said stand the motor-pulley can be moved from or toward the pulley of the driven machine to tighten or slacken the driving-belt connecting said pulleys. The movable contact arm or device referred to and which makes or breaks the circuit and the brake arm or device movable therewith are preferably connected with the ordinary sewing-machine "heel-and-toe" or double-acting treadle, so as to be moved thereby to make or break the circuit and so that by a heel-pressure on the treadle the spring-pressure of the brake on the brake-wheel may be supplemented or added to if it be desired to stop the motor very quickly when it is running rapidly.

In the accompanying drawings, Figure 1 is a front view of a sewing-machine drop stand or table with the invention applied thereto. Fig. 2 is an end view of the same looking from the right of Fig. 1, the parts to the right of the line 2 2, Fig. 1, being omitted. Fig. 3 is a detail view of the motor, partly in section. Fig. 4 is a detail view of the belt-holding device unlatched to slacken the belt. Fig. 5 shows a modified form of the invention, and Fig. 6 is an enlarged detail view of a part of the same.

Referring to the drawings, 12 denotes the legs or side frames of the stand, supporting the table 13, on which the sewing-machine 14 is mounted, said legs or side frames being connected by the usual brace 15. The electric motor is contained in a casing 16, which is rigidly connected to or formed integral with a support or bracket 17, hinged or pivoted to the brace 15 by center screws 18 or otherwise. Rigidly connected with the said motor and hinged support or bracket is a rheostat-box 19, having a series of contacts 20. The hinged support or bracket 17 has a vertical bar 21, provided near its top and bottom with adjusting-screws 22, abutting against a vertical bar 23 of the brace 15, and to tighten or slacken the driving-belt 24, connecting the motor-pulley 25 with the driving-pulley 26 of the sewing-machine, one of the said screws may be turned in and the other be turned out to change the position of the motor and its pulley, and thus effect any desired adjustment of said motor-pulley. These screws, in coöperation with the bar 23, also serve to hold the movable motor in any position to which it may be adjusted, as will be understood.

Fixed to the shaft of the motor adjacent to the pulley 25 is a brake-wheel 27, and hinged to the motor support or frame is a brake lever or arm 28, having a brake-shoe 29, normally pressed against said brake-wheel by a torsional coil-spring 30, acting on said brake-lever. The rheostat box or frame is provided with a swinging arm or lever 31, which carries a contact plate or switch 32, arranged to engage any one of the contacts 20 of the rheostat, said arm or lever 31 being connected by a link or pitman 33 with the brake-lever 28 and by a second link or pitman 34 with the heel-and-toe treadle 35, pivotally mounted in the usual manner in the brace 15.

From the foregoing it will be understood that by depressing the forward or toe portion of the treadle 35 the brake-shoe 29 will be removed from contact with the brake-wheel 27 of the electric motor, such movement of the treadle also causing the contact plate or switch 32 (which is understood to be in electrical connection with a source of electricity) to touch some one of the contacts 20 of the rheostat, and thus start the motor and the sewing-machine driven thereby. The contacts of the rheostat are so arranged that an increasing speed of the motor is secured as the toe portion of the treadle is moved farther downward, and vice versa, so that the sewing-machine may be driven at any desired speed.

To stop the machine, the toe-pressure on the treadle is released, when the spring 30 instantly removes the contact plate or switch 32 from the contacts of the rheostat to break the electric circuit, and said spring simultaneously forces the brake-shoe 29 into frictional contact with the brake-wheel 27 of the motor to quickly stop the latter. Should the running speed of the motor be such that the stress of the spring 30 is insufficient to stop the machine as quickly as might be desired, the pressure of the brake-shoe on the brake-wheel may be augmented or increased by a heel-pressure on the treadle, so that an upward pressure from the toe portion of the treadle is transmitted to the brake-shoe through the link or pitman 34, the rheostat arm or lever 31, the link or pitman 33, and the brake arm or lever 28, these parts affording a positive connection between said treadle and brake-shoe.

The driving-belt 24, connecting the pulleys 25 and 26, preferably runs over an idler-pulley 36, carried by a swinging arm 37, hinged to a bracket 39, rigidly attached to one of the legs or side frames of the stand, said swinging arm being provided with a catch 40, engaged by a pivoted latch 41, pivoted to a part 38 of the bracket 39, said latch serving to hold said swinging arm in such position as to keep the belt taut. If it be desired to slacken the belt to enable the sewing-machine to be turned up on its hinges on the table, (for access to the parts beneath the work-plate of the machine or preparatory to lowering the machine into its receptacle beneath the table of the drop-stand,) the latch 41 may be lifted out of engagement with the catch 40, thus freeing the swinging arm 37 and loosening the said belt. When the belt is loosened or slackened, it is still retained in the groove of the idler-pulley 36 by the plate or small bracket 42, attached to the said swinging arm 37 and overlying said belt.

Owing to the fact that the motor support or bracket 17 and the center screws, on which said support or bracket is hinged or pivoted, occupy the position which is usually occupied by the treadle-operated driving-wheel of the sewing-machine stand and the shaft and pivot or pivots of said wheel, the electric motor herein shown and described is adapted to be applied to sewing-machine stands now in use simply by removing the driving-wheel mechanism and treadle-pitman from the stand and substituting therefor the parts herein shown and described, and the machine may be readily changed back to a foot-power machine by removing the electric motor and appurtenances herein shown and described and replacing the treadle-operated driving-shaft and pitman.

Instead of having the motor pivotally mounted on the brace of the machine, as in the construction already described, it may be movably mounted, as shown in Fig. 5, on a horizontal bracket 43, attached to the table 13, the base 47 of the motor-frame being slidingly mounted on said bracket, so as to be adjustable horizontally by a thumb-screw 44 to tighten or slacken the driving-belt, the motor being also retained in any desired position of adjustment by the said thumb-screw, which is swiveled in a boss 45 of the said bracket 43 and tapped at its inner end in said motor-frame. In this form of the invention the motor brake-lever is connected with the treadle in the same manner as in the construction already described, excepting that the lower link or pitman of the connections is somewhat longer to reach the treadle; also, in this form of the invention it is not necessary to remove the ordinary treadle-operated driving-wheel 46 of the stand, and thus the machine may be quickly converted from a treadle-operated machine to a motor-operated machine or back again to a treadle-operated machine simply by removing the ordinary driving-wheel pitman and substituting the pitman 34, as will be readily understood.

The present invention is not necessarily limited in its use to sewing-machine stands, as it is also adapted for other uses in which the motors are separate from the machines to be driven, as for driving graphophones and the like, nor is the invention necessarily limited to motors movably or adjustably mounted in stands or to treadle-operated motor-controlling devices. It will be observed, however, that in the present invention, as herein illustrated, the brake is mounted directly on the motor-frame, so that it is always present in operative relation to the brake-wheel on the driving-shaft of the motor, and the addition to the motor of a special brake device is therefore not required, as has been necessary in some devices heretofore in use.

Having thus described our invention, we claim and desire to secure by Letters Patent—

1. The combination with a sewing or other machine to be driven, of an electric motor the shaft of which is separate from said machine and which motor-shaft is provided with a brake-wheel, a brake to engage said wheel and which is mounted on the motor-frame, and a switch, to make and break the electric circuit, connected with said brake so that when the circuit is broken the said brake will be applied to said brake-wheel, and when the circuit is closed the said brake will be removed from said wheel.

2. The combination with a sewing or other machine to be driven, of an electric motor the shaft of which is separate from said machine and which motor-shaft is provided with a pulley and a brake-wheel, a brake to engage said brake-wheel and which brake is mounted on the motor-frame, a switch, to make and break the electric circuit, connected with said brake so that when the circuit is broken the said brake will be applied to said wheel, and when the circuit is closed the said brake will be removed from said brake-wheel, and a rheostat having a series of contacts with any one of which the said switch may be placed in contact when the circuit is to be closed.

3. The combination with a sewing or other machine to be driven, of an electric motor separate from said machine and the shaft of which is provided with a pulley and a brake-wheel, a brake to engage said brake-wheel and which brake is mounted on the motor-frame, a switch, to make and break the electric circuit, connected with said brake so that when the circuit is broken the said brake will be applied to said wheel, and when the circuit is closed the said brake will be removed from said wheel, a rheostat having a series of contacts with any one of which the said switch may be placed in contact when the circuit is closed, and a heel-and-toe treadle positively connected with said brake.

4. An electric motor the shaft of which is provided with a pulley for transmitting power and with a brake-wheel, combined with a spring-pressed brake-lever mounted on the motor-frame and provided with a brake normally pressed against said brake-wheel by its controlling-spring.

5. The combination with a stand or table comprising side frames or legs and a brace connecting the same, of a machine to be driven mounted on said stand or table and provided with a pulley, an electric motor having a hinged or pivoted connection with the said brace and the shaft of which motor is provided with a pulley to be belted to the said first-named pulley, so that by changing the position of said motor, by swinging it on its hinged or pivotal connection with said brace, the belt connecting said pulley may be tightened or loosened, and means for securing said motor in any desired position of adjustment.

6. The combination with a sewing-machine stand comprising legs or side frames and a connecting-brace, said stand being provided with a treadle, of an electric motor pivotally mounted in said stand and provided with a pulley and a brake-wheel, a sewing-machine supported by said stand and having a pulley to be driven, a brake to engage said brake-wheel, means for adjusting said motor on its hinged or pivotal mounting on said stand and for holding said motor in any desired position of adjustment, and a rheostat having a series of contacts to be engaged by said switch; the parts being so arranged that when said treadle is moved to disengage said brake from the brake-wheel the current may be turned onto said motor and so that the electric circuit may be broken when the said brake is applied to said brake-wheel.

7. The combination with a sewing-machine or similar stand or table provided with a treadle and with means for mounting a treadle-operated driving-wheel in or on said stand or table, of an electric motor provided with means whereby it may be attached to said stand or table interchangeably with and in the place at which the said driving-wheel is normally mounted, so that the motor-attaching devices occupy the position usually occupied by the driving-wheel mountings when the said electric motor is employed as a substitute for foot-power.

8. The combination with a stand or table provided with bearings suitable for receiving the band-wheel shaft and driving-wheel of a treadle driving device, and with a treadle mounted in the lower portion of said stand or table, of a machine to be driven mounted on said stand or table, an electric motor having a frame provided with journals fitted to said band-wheel shaft-bearings, means for maintaining said motor-frame stationary upon said stand or table when applied thereto, means for controlling the operation of said motor, a connection from said controlling means to said treadle, and a connection from said motor to said machine to be driven.

9. The combination with a stand or table and a machine to be driven mounted thereon, of an electric motor the shaft of which is separate from the shaft of the machine to be driven and which motor-shaft is provided with a brake-wheel, a brake mounted on the motor-frame adjacent to said brake-wheel, and a treadle mounted in the lower part of said stand or table and positively connected with said brake so that the frictional pressure of said brake on said brake-wheel may be controlled by said treadle.

In testimony whereof we affix our signatures in presence of two witnesses.

HERBERT S. MILLER.
GUSTAVE C. MARX.

Witnesses:
W. E. CARMICHAEL,
HENRY J. MILLER.